Feb. 26, 1935.   G. J. MATT   1,992,709
COLLECTOR'S STAMP
Filed April 26, 1934
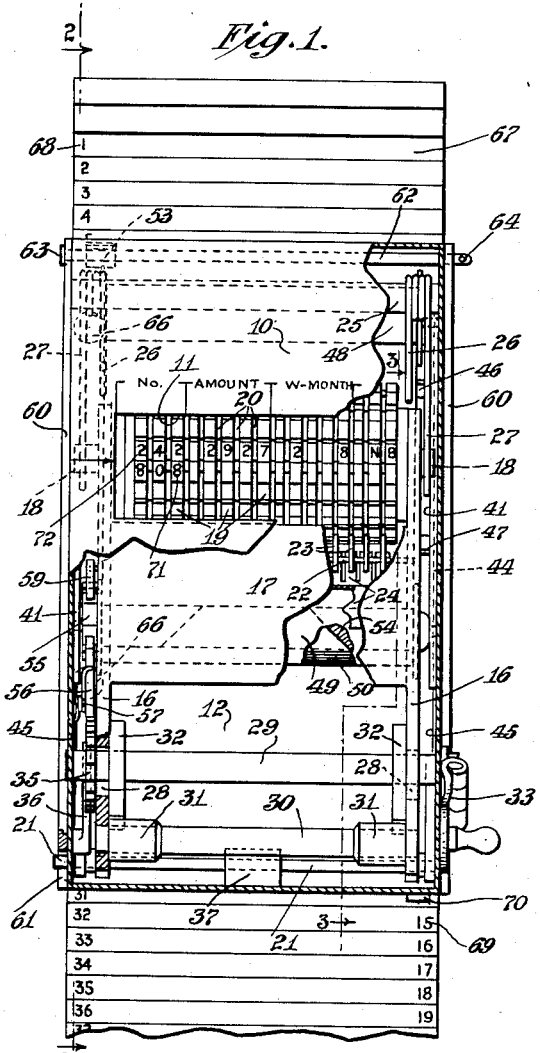
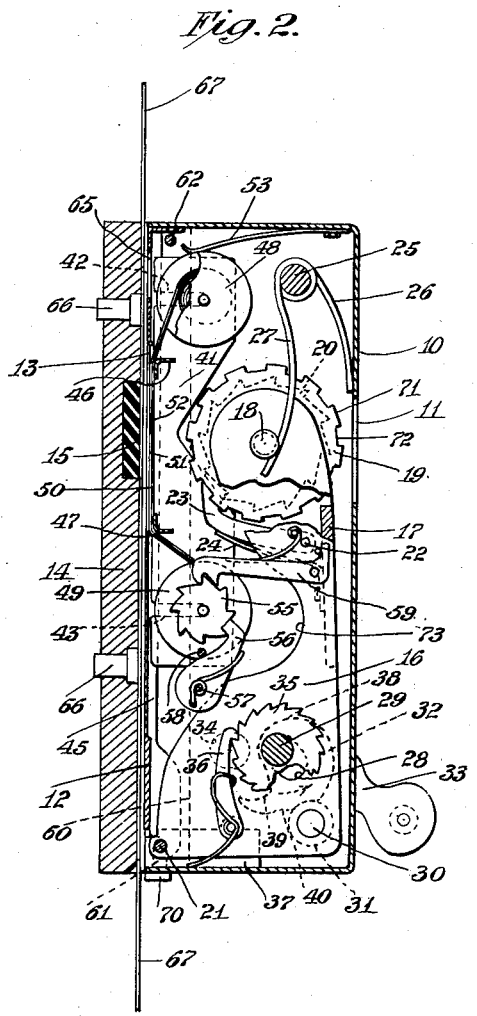
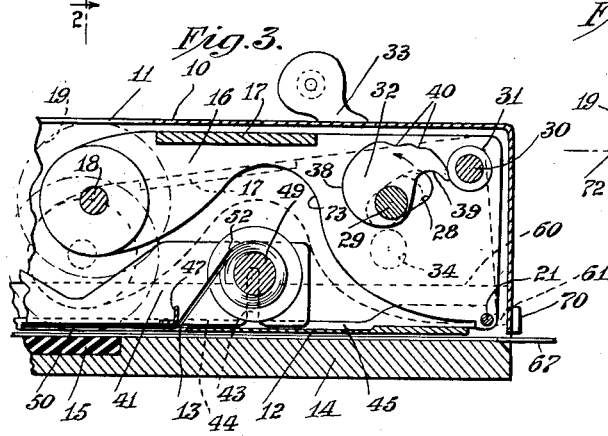
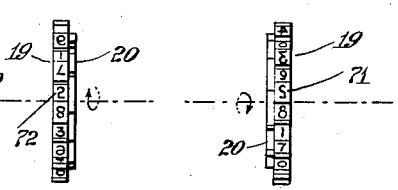
George J. Matt
INVENTOR
BY
ATTORNEY.

Patented Feb. 26, 1935

1,992,709

UNITED STATES PATENT OFFICE 1,992,709

COLLECTOR'S STAMP

George J. Matt, Brooklyn, N. Y., assignor to Roberts Numbering Machine Company, Brooklyn, N. Y., a corporation of New York Application April 26, 1934, Serial No. 722,534

17 Claims. (Cl. 101—90)

The invention relates to collector's stamps, and more particularly to a portable stamp, having manually set and spring actuated printing elements.

Stamps of the type to which the invention relates are to be employed to ensure the making of duplicate records by collectors of each transaction in which the stamp is used, one record evidencing a proper credit upon the individual record of the debtor, and the other, which is inaccessible to the collector, disclosing to the collector's principal, full information as to collections made or demanded. In this manner, the creditor, (the collector's principal) upon the completion of each day's work by a collector, has full data as to collections made, the amount of each collection, from whom and when collections were made, and identification markings of the collector. From this data, the permanent records of the principal may be made to accord with the records of the debtor, and the amount of money to be turned in by the collector is verified. Since it is an obligation on the part of the debtor to see that he is properly credited, upon his own record, with the amount of money paid to a collector, and since the private or concealed record must be in accord with the record of the debtor, controversies as to the standing of any account cannot arise or cannot be successfully maintained by a debtor who has failed in his obligation to see that his individual record shows the correct amounts paid by him.

Experience has shown that misappropriation of funds by collectors is not often deliberate, but is the outgrowth, either of a misapplication of funds actually collected, in part to wrong accounts, where money is not paid and the debtor fails to make good, or of mistakes in the making of records of each transaction.

A stamp embodying the invention will prevent losses to a debtor, to the collector and to the creditor from this and other practices which enable a collector to turn in to his principal at any time, an amount less than that actually collected or than has been credited to debtors. The record made of transactions for the benefit of the principal by indicating all of the actual transactions made during a day or other period, will by exclusion, indicate delinquent debtors, since there will be an absence from the record of any record referring to their accounts, or the record may show a demand made without receiving payment.

The main purpose of the machine is to enable the collector to make at one and the same time, accurate duplicate records of each transaction in a manner which will prevent subsequent alteration of either record for the purpose of defrauding the creditor whether such alteration be by the debtor or by the collector.

A collector's stamp embodying the invention is so constructed that its overall dimensions and weight are such that it may be conveniently carried in a pocket of ordinary size. The various parts are so combined and housed that there is no likelihood of the breakage, disarrangement or loss of adjustment of parts resulting from an improper handling of the machine in its use, or even by the dropping of the machine upon a hard floor. This is a highly desirable characteristic in a machine of this type, since a failure of the machine to function properly would justify the making of records by hand, and deliberate, accidental or improper entries made by hand might, and frequently does result in unwarranted claims by debtors and a misappropriation of funds by a collector.

In addition to the provision of strong and rugged structural characteristics throughout the stamp, the construction and arrangement of parts must be such as to ensure at all times the making of a clean, sharp record. To ensure this, the printing mechanism is actuated by means of heavy springs and a control operative upon these springs, through the printing mechanism, by which the springs may be easily tensioned to develop and store the necessary energy for actuating said mechanism, and yet avoid the actuation of the printing mechanism except under the manual control of the operator.

The printing mechanism embodies therein a plurality of indicia wheels capable of being individually turned by hand to set the desired printing characters, each of these wheels having thereon a plurality of pairs of printing and non-printing characters, one of each pair duplicating the other and so spaced in relation thereto that the visible position of a non-printing character will indicate a proper setting of the printing character of the pair.

The various indicia wheels must be exposed through a sight opening through which access may be had to the wheels for the purpose of setting them. The arrangement of parts is such that access cannot be had to the interior of the housing of the stamp for the purpose of deliberately so obstructing any of the mechanisms as to make the machine inoperative. While it is true that inoperativeness of the machine might be used as an excuse to justify the record of collections by entries made by hand, detection of deliberate interference with the mechanisms of the machine is unavoidable, and this practice would ordinarily not be resorted to, even though the construction of the machine were such as to permit it. The characters of the records made and the certainty of detection in the event of the making of improper records, is a strong deterrent to practices of this kind.

In the machine of the invention, the creditor's or principal's record is in strip form, the impression being made upon this strip and upon the debtor's record by means of carbon paper, such carbon paper and the record strip being superimposed one upon the other, in a manner to ensure the making of the two records with each actuation of the machine. The use of ink pads or ink saturated strips of ribbon is not feasible with a machine of the type to which the invention relates, because the fouling of the indicia wheels will result in the soiling of the hands of the user in a manner to make the handling of debtor records and of the machine in transactions of the nature in which they are used undesirable, particularly as the smutting of the record strips or of the fingers of the collector may lead to the defacing of records in a manner to make subsequent record of transactions more or less illegible.

The length of the record and associated carbon strips is required to be merely sufficient to record a series of transactions within a limited period, and in checking up upon such transactions these strips must be removed from the machine and new strips substituted therefor. The construction of the machine is such as to permit a ready access thereto for the purpose of removing and replacing record strips by an authorized party, this construction being such as to permit the free actuation of the reels carrying said strips following the making of each impression by the printing mechanism, and retardation of the movement of the supply reel to an extent to prevent the formation of slack therein as a result of the actuation of the rewind reel by the printing mechanism while permitting sufficient movement of the strips immediately prior to the making of the impression to prevent mutilation of the strips.

The entire stamp is so constructed as to possess but little weight, the various parts of the mechanism, serving to impart sufficient rigidity to the structure as a whole to give it the desired strength and durability. The overall dimensions of the stamp, as actually produced, is substantially that disclosed in the accompanying drawing, so that the structure may be readily carried in the pocket of a collector, the construction being such as to preclude the accidental actuation of the printing mechanism when so carried.

The machine of the invention is designed to be used with a strip record adapted to be manually positioned in relation to the indicia wheels by gauge markings carried by the debtor's record strip and a suitable gauge upon the housing of the stamp, the construction being such as to permit the insertion of this record strip in the stamp in a manner to ensure the proper guiding and locating of the strip to have the various items impressed thereon by the printing mechanism in their proper relation to the lines upon this strip.

The invention consists primarily in a collector's stamp embodying therein a housing having openings through the bottom and the top thereof, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative power compounding mechanism acting upon said spring through said frame, supply and rewind reels upon opposite sides of said bottom opening, a plurality of superimposed record and carbon strips passing from said supply reel to said rewind reel with a carbon coated surface presented toward said bottom opening, guides for said strips, and cooperating means carried by said rewind reel and said pivotal frame, whereby said strips will be advanced with each actuation of said frame by said power compounding mechanism; and in such other novel features of construction and combination of parts as are hereinafter set forth and more particularly pointed out in the claims hereto appended.

Referring to the drawing,

Fig. 1 is a plan view of a collector's stamp embodying the invention with portions thereof broken away;

Fig. 2 is a section on the line 2—2 of Fig. 1;

Fig. 3 is a section on the line 3—3 of Fig. 1; and

Fig. 4 is a top view of one of the indicia wheels; and

Fig. 5 is a bottom view of the same wheel.

Like numerals refer to like parts throughout the several views.

In the embodiment of the invention shown in the drawing, all of the operative mechanisms of the machine, excepting the actuating handle, are inclosed by a housing 10, closed at the top with the exception of a top sight opening 11 and having an open bottom closed by means of a removable bottom plate 12 having an opening 13 therethrough immediately below the opening 11. Within this housing are a printing mechanism, a manually operative power compounding actuating mechanism, springs normally acting upon the printing mechanism in a manner to cause the making of the impression by a staccato blow of the printing elements of said mechanism, and a strip supporting, guiding and feeding mechanism. This housing and its contained parts are carried by and spaced from a platen base 14, the tympan 15 of which is positioned immediately below the bottom opening 13.

As will more fully appear hereinafter, the housing 10 is removable in its entirety from the platen base 14 and means are provided by which the removal of the housing from said base plate is prevented except by one authorized to have access to the mechanisms within the housing 10.

The printing mechanism comprises a pivotal frame having side plates 16 adjacent opposite side walls of said housing, and a cross stay 17 imparting rigidity to the frame structure and affording a support for different mechanisms embodied in the printing unit. Extending between the opposite arms 16 of this frame is a shaft 18 having idly mounted thereon, a plurality of indicia wheels 19, each provided with a ratchet wheel 20.

Each of the indicia wheels 19 is structurally the same as every other wheel, excepting that the printing and non-printing characters may differ as to different wheels according to the record which it is desired to make by means of such wheels. As indicated in Fig. 1 of the drawing, one group of wheels is used to designate the number of an account to be collected, another group is intended to be used in indicating the amount collected, a third group is to indicate the date, and the fourth group is to indicate the collector using the machine. The arrangement of the printing and non-printing characters of each wheel will be described hereinafter.

The frame having the side plates 16 is pivotally mounted adjacent one end and the bottom of the housing 10, by means of a pivot rod 21 extending from side to side and projecting beyond the sides of said housing in a manner to permit the utilization of said rod in attaching the housing to the platen base 14. Extending from side frame to side frame 16 is a pivot pin 22 upon which is mounted a plurality of detent pawls 23 co-operating with the ratchet wheels 20 upon the several indicia wheels 19. Also carried by said cross stay 17 is a comb spring 24, the teeth of which respectively co-operate with a detent pawl 23.

Extending from side to side of the housing 10 is a distance rod 25 upon which are mounted the printing mechanism actuating springs, one arm 26 of each of which bears upon the top of the housing 10 and the other arm 27 of each of which bears upon the ends of the shaft 18, which project beyond the side plates 16 and are grooved to receive these springs. The spring arms 26 and 27 are so tensioned as to normally exert a downward pressure upon the shaft 18 and therethrough upon the pivotal frame carrying said shaft as to impart movement to the indicia wheels toward the bottom 12.

The detent pawls 23 are so set as to position the printing characters in a manner to compensate for the arc described by said wheels when the frame carrying same is actuated by said springs 26 and 27.

Said springs are combined torsion and straight wire springs and the arm 27 of each spring is of a length to constantly engage the shaft 18 irrespective of the position of this shaft during the operation of the machine.

Each of the side plates 16 is provided with an arcuate slot 28 and extending from side to side of the machine and passing through said slot is a shaft 29 rotatably mounted in the sides of the housing 10.

Carried by the printing mechanism frame is a shaft 30 having mounted adjacent the opposite edge thereof, anti-friction rollers 31 engaged by cams 32 carried by and rotatable with the shaft 29. Also carried by the shaft 29 is a crank 33 consisting of two sections hinged together so as to permit the insertion of the handhold of said crank in an opening indicated at 34 in Figs. 2 and 3 of the drawing.

Also carried by the shaft 29 is a ratchet wheel 35 co-operating with which is a spring pressed hold-back dog 36.

The pivot rod 21 is supported intermediate its length by a reinforcing block 37 secured to one end wall of the housing 10 in any desired manner. The various shafts and rods 21, 25 and 29 serve to stay and stiffen the side walls of the housing 10.

Each cam 32 is provided with a graduated rise 38, an abrupt fall 39 and two short rises and falls 40 before the rise 38 reaches its highest point, these depressions or rises and falls 40 serving to prevent accidental rotation of the cam to an extent to permit accidental actuation of the printing mechanism in the event the stamp is subjected to jolts and jars. They also serve to indicate to the user of the machine, the likelihood of overturning of the shaft 29 in a manner to release the printing mechanism when it is not desired.

The shaft 30, with its anti-friction rollers 31, is spaced as far as possible from the pivot rod 21, so that with the actuation of the cams 32, the power applied to the shaft 29 is compounded to an extent to permit the application of sufficient power to the springs 26—27 to permit the tensioning of these springs with the exertion of small effort by the user of the machine. There is, in this power compounding system, the leverage of the crank shaft 33 itself, the powerful action of the cams 32 and the application of the power developed from the turning of said cams to the frame of the printing mechanism at an effective leverage.

Secured to each side wall of the housing 10 is a plate 41 having therein slots 42 and 43 positioned upon opposite sides of the opening 13 in the bottom closure plate 12. The bearing plates 41 are provided with a downwardly presented channel 44 at the bottom thereof for the reception of side flanges 45 upon the bottom plate 12. Said bearing plates 41 have formed integrally therewith, or permanently secured thereto, guide bars 46 and 47 for the record and carbon strips, these bars being so located that when the bottom plate 12 is in position, they will extend from side to side of the housing 10 adjacent the opposite ends of the bottom opening 13. These guide bars which, in the form of the invention shown, are angle metal bars, also aid in stiffening the housing 10.

Mounted in the bearing slots 42 is a supply reel 48, and mounted in the slots 43 is a rewind reel 49. Each of these reels is of an old and well known construction having a movable bearing pin at either or both ends thereof adapted to enter thrust bearings in the side walls of the housing 10.

Passing from the supply reel 48 to the rewind reel 49 is a plurality of superimposed strips consisting of a carbon strip 50, the coated surface of which is presented toward the opening 13, a record strip 51 consisting of paper of heavier weight and possessing greater tensile strength than the paper ordinarily used in the production of carbon paper, and another strip of carbon paper 52 having its coated surface engaging the record strip 51.

Secured to one end wall of the housing 10 is a retard spring 53 acting upon the perimeter of a side flange upon the supply reel, the purpose of this spring being to prevent overrunning of the composite strip 50, 51 and 52. This spring 53 has a curved end as shown, so that in moving the supply reel 48 along its bearing slots 42, said spring 53 will be readily tensioned and will not interfere with the mounting of the supply reel in the stamp.

The construction of the rewind reel 49 is such as to permit the convenient attachment of one end of the composite record strip thereto, such as a tapered slot passing through said reel shown at 54.

Carried by said rewind reel 49 is a ratchet wheel 55 co-operating with which is a spring pressed detent pawl 56 pivoted at 57. The location of this pawl is such that with the movement of the arbors of said rewind reel along the slot 43, the detent pawl will be engaged with the teeth of the ratchet wheel 55. A stop pin 58 is used to limit the movement of said pawl 56 to facilitate the convenient mounting of the rewind reel in the stamp.

Pivotally mounted upon one of the side plates 16 of the printing mechanism frame is a spring pressed ratchet pawl 59 co-operating with the ratchet wheel 55 in imparting movement to the rewind reel, and therethrough, a feeding movement to the composite record strip. The bottom plate 12 is pivotally mounted by means of the side webs or flanges 45 thereon, upon the pivot rod 21, the said webs or flanges adjacent said point of pivotal support being of greater thickness than the rest of the web, as shown in Fig. 1.

The base 14 is provided with side flanges 60, so spaced in relation to each other as to receive the lower edge of the housing 10 therebetween. These flanges, at one end thereof, are provided with slots 61 adapted to pass over the projecting ends of the pivot rod 21. The housing 10 is secured in relation to the base 14 by means of the slotted side flanges 60, the pivot rod 21 and a locking pin 62 passing through openings toward the ends of the side flanges 60 opposite to the slotted ends thereof, and through openings in the side walls of the housing 10. One end of the locking pin is provided with an enlarged head 63, and the other end thereof with an opening 64 therethrough for the reception of a seal, lock or other means preventing removal of the pin. The head 63 is adapted to be engaged with an opening 65 in the bottom plate 12 to aid in the exposure of the interior of the housing 10 by the pivotal movement of said bottom plate 12 about the pivot rod 21.

The base 14 is provided with a plurality of clamp studs 66 movably mounted in said base, the tops of these studs being normally flush with the top of the base, and the bottom thereof projecting slightly below the bottom of the base, so that if the stamp is set upon any surface, these pins will develop a clamping action commensurate with the weight of the stamp against the record sheet shown at 67.

It will be noted that the pivot rod 21 and the locking pin 64 hold the housing 10 spaced above the base 14 to an extent to form a slot through which said record strip 67 may be passed, and that the side flanges 60 serve as opposite gauges to keep said strip 67 against lateral deflection when passing it through the stamp.

The debtor's record 67 is provided with gauge numbers 68 and 69 along opposite edges thereof. These numbers, upon one side of the machine, are staggered in relation to those on the other side of the machine to permit the locating of any line concealed within the slot between the housing 10 and the base 14 by means of a gauge 70 upon one end of the housing 10, which is positioned adjacent the tier of gauge numbers 69.

Each indicia wheel 19 is provided with a plurality of pairs of duplicated characters, one of which is a printing character and the other of which is a non-printing character. The characters of each pair are positioned approximately 180° apart, departing from this merely by an amount which will compensate for the arcuate movement of the printing wheels. A printing character of one pair is indicated at 71 in Fig. 5 of the drawing. The non-printing character of the same pair is indicated at 72 in Fig. 4 of the drawing.

The side plates 16 of the printing frame are recessed as shown at 73 adjacent the cross stay plate 17 to provide the necessary clearance in said side plates adjacent the rewind reel 49.

The operation of the herein described stamp is substantially as follows:—

In the use of a stamp embodying the invention, a collector is provided by his principal with a list of debtors and is furnished a stamp in which the supply and rewind reels 48 and 49 are in position, and the housing 10, with its contained parts, is secured to the platen base 14 by means of the lock pin 62 which, if desired, may be secured against removal by means of a wire seal, a lock or any other desired means.

To mount the record and carbon strips in a stamp before delivering the stamp to a collector, it is merely necessary for an authorized party to remove the lock pin 62 and slide the base and the housing in relation to each other until the ends of the pivot rod 21 escape from the slots 61 in the side flanges 60 of the base 14, invert the housing, raise the bottom plate 12, force the supply reel downwardly with its arbors in the slots 42, attach the end of the composite strip 49, 50 and 51 to the rewind reel, draw enough of the composite strip from the supply reel to permit the proper location of the rewind reel, and force this reel downwardly with its arbors positioned in the slots 43. This properly locates the composite strip which is given the proper form by engagement with the guide bars 46 and 47, the reach of the composite strip between said bars being closely adjacent the opening 13. The mere positioning of the supply and rewind reels properly locates the former in relation to the spring 52, and the ratchet wheel 55 upon the latter in relation to the detent pawl 56 and the ratchet pawl 59.

When the parts are in this position, it is merely necessary to close the bottom plate 12 and insert the locking pin 62 through the flanges 60 and openings in the side wall of the housing 10, and apply a lock to the opening 64 of this pin.

It will be noted, when closing the bottom plate 12, that the coated surface of the carbon strip 49 is exposed through the opening 13 in said bottom plate.

The collector, in using the stamp, merely turns selected indicia wheels 19 by hand until the desired number of the account, the amount due, the date and his key number appear in alinement with gauge markings upon the top of the housing and through the top sight opening 11 of the housing 10.

When the machine is not in use, the cams 32 will be so set as to raise the printing frame so that the perimeters of the various wheels will be conveniently accessible through said opening 11 when turning the wheels, and will be held against displacement by pressure applied to the wheels when turning them, or by the springs 26—27, by the rises and falls 40 upon said cams.

The bringing of the non-printing characters 72 into alinement at the opening 13 will bring the duplicate printing characters into their printing position directly above the opening 13.

After a collection has been made, the collector merely turns the crank 33 clockwise until the high point of the rise 38 of the cams passes out of engagement with the rollers 31 upon the shaft 30, whereupon the springs 26—27 impart a rapid, oscillatory movement to the printing frame, movement of the shaft 30 and rollers 31 being permitted by the abrupt fall 39 of the cams.

The movement of the printing frame and of the indicia wheels carried thereby is a fairly short, very rapid movement, and the force of the blow of the printing characters upon the composite strip, and therethrough upon the record sheet 67, is very much heavier than results when a typist is operating a typewriting machine. The result is a sharp, clearly defined imprint, not only upon the debtor's record strip 67, but upon the inaccessible record strip 50.

When actuating the machine, the general practice is to stand the machine upon some article and, when this is done, the clamp studs 66 will be forced upwardly of the base 14 and will firmly hold the record strip 67.

After the making of a record and before the slip 67 can be removed from the stamp, it is essential that the shaft 29 be turned in a manner to cause the cams 32 to raise the frame of the printing mechanism, this movement of said frame lifting the printing wheels and disengaging them from the composite record strip and at the same time tensioning the springs 26—27 preparatory to the next actuation of the machine.

The power compounding mechanism afforded by the cams acting upon rollers eccentric to the axis of the pivot rod 21, requires but little exertion on the part of the user when raising said frames. As the point of contact between the cams 32 and the rollers 31 approaches the high point of the rise of said cams, said rollers will drop into the first of the depressions 40 and thus momentarily arrest further movement of the cams.

With the downward movement of the indicia wheels by the springs 26—27 and with the engagement of printing characters thereon with the composite strip, this strip may have that slight lineal movement necessary to force the lower coated face of the carbon strip 49 into engagement with the debtor's record strip 67. The spring 53 permits the creation of slack in the composite strip with this movement of the indicia wheels. It will however, be slight.

With the downward movement of the ratchet pawl 59 with the side plates 16 of the printing mechanism frame, the teeth of this pawl will ride over those of the ratchet wheel 55 without imparting movement thereto or to the rewind reel, the detent pawl 56 preventing movement of said ratchet wheel by the frictional engagement of the pawl 59 therewith.

When the crank 29 is turned to raise the frame in the manner heretofore described, the pawl 59 will impart a partial rotation to the ratchet wheel 55 and the rewind reel 49, sufficient to draw the composite record strip across the opening 13 to an extent to ensure a proper spacing of succeeding entries made by the indicia wheels upon the record strip 50.

The hold-back dog 36 co-operates with the ratchet wheel 35 and holds the tension of the springs 26—27 during movement of the printing mechanism frame by the cams 32. The arcuate slots 28 permit movement of the side plate 16 in relation to the shaft 29 carrying the cams 32.

The upward movement of the frame of the printing mechanism is a slow, gradual movement, so that the composite strip 49, 50 and 51 is subject to no sudden stresses which would tend to tear or otherwise mutilate same, and during the movement of said strip the spring 53 offers sufficient resistance to the turning movement of the supply reel to ensure against possible creation of slack or the formation of resulting wrinkles which might interfere with a clean, sharp imprint upon the debtor's record strip 67 or the record strip 50.

With a stamp embodying the invention, a record, which is not accessible to the collector and which cannot be altered, even though it were accessible to him, is made of each transaction, and the record so made must conform to that made upon the debtor's record strip. An actuation of the machine, when a record strip 67 is not positioned therein, would indicate that the collector had received more money than debtors have paid. It is impossible, with the stamp of the invention, to make any record of payments by means of the machine upon a strip 67 without duplicating this record upon the strip 51, and it is impossible to so position all of the indicia wheels that some matter will not be impressed upon said strip 50.

In the embodiment of the invention shown in the drawing, the indicia wheels 19 have twelve printing characters and twelve non-printing characters, the latter being located upon depressed portions between printing characters. The number of characters, of course, may be varied to meet the requirements of the users of the stamps. The ratchet wheels 20 each have one tooth extending through 30° of the perimeter thereof so that when turning the wheel, each impulse thereof must be sufficient to include both a printing and a non-printing character. The resistance offered to the turning of an indicia wheel by the detent pawl 23 co-operating with the ratchet wheel of that wheel, precludes possibility of the bringing of a non-printing character to the printing position.

The various parts in the stamp of the invention are few in number and so compactly arranged in relation to each other as to permit the production of an article having sufficiently small outside dimensions to permit it to be readily carried. The arrangement of parts is such as to permit convenient access thereto when assembling the stamp, and the use of parts possessing sufficient inherent strength to withstand not only the ordinary conditions of use, but severe abuse of the stamp. The various mechanisms cannot be tampered with, and the machine cannot be actuated in a way which will allow other than the making of accurate, duplicate records.

It is not my intention to limit the invention to the precise details of construction shown in the accompanying drawing, it being apparent that such may be varied without departing from the spirit and scope of the invention.

Having described the invention, what I claim as new and desire to have protected by Letters Patent, is: —

1. A collector's stamp embodying therein a housing having openings through the bottom and the top thereof, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative power compounding mechanism acting upon said spring through said frame, supply and rewind reels upon opposite sides of said bottom opening, a plurality of superimposed record and carbon strips passing from said supply reel to said rewind reel with a carbon coated surface presented toward said bottom opening, guides for said strips, and co-operating means carried by said rewind reel and said pivotal frame, whereby said strips will be advanced with each actuation of said frame by said power compounding mechanism.

2. A collector's stamp embodying therein a housing having openings through the bottom and the top thereof, a printing mechanism including a rocking frame pivoted against the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative shaft, a cam carried thereby having a gradual rise and an abrupt fall, means engageable by said cam carried by and spaced radially from the pivotal support of said frame, whereby the power of said cam is applied to said frame at an effective leverage, supply and rewind reels upon opposite sides of said bottom opening, a plurality of superimposed record and carbon strips passing from said supply reel to said rewind reel with a carbon coated surface presented toward said bottom opening, guides for said strips, and co-operating means carried by said rewind reel and said pivotal frame, whereby said strips will be advanced with each actuation of said frame by said cams following the making of each impression.

3. A collector's stamp embodying therein a housing having openings through the bottom and the top thereof, a printing mechanism including a rocking frame having side plates, a pivot rod adjacent the bottom and one end of said housing upon which said side plates are pivotally mounted, a shaft connecting the side plates adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative shaft mounted in said opening, said side plates having arcuate openings through which said shaft passes, cams carried by said manually operative shaft adjacent each side plate of said frame, each of said cams hving a gradual rise and an abrupt fall, a shaft connecting said side plates and spaced radially from said pivot rod, anti-friction rollers upon said shaft and engageable by said cams respectively, whereby the power of said cams is applied to opposite sides of said frame at an effective leverage, supply and rewind reels upon opposite sides of said bottom opening, a plurality of superimposed record and carbon strips passing from said supply reel to said rewind reel with a carbon coated surface presented toward said bottom opening, guides for said strips, and co-operating means carried by said rewind reel and said pivotal frame, whereby said strips will be advanced with each actuation of said frame by said cams following the making of each impression.

4. A collector's stamp embodying therein a housing having openings through the bottom and the top thereof, a printing mechanism including a rocking frame pivoted against the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative shaft, a ratchet wheel carried by said shaft, a hold-back dog co-operating with said ratchet wheel, a cam on said shaft having a gradual rise and an abrupt fall, means engageable by said cam carried by and spaced radially from the pivotal support of said frame, whereby the power of said cam is applied to said frame at an effective leverage, supply and rewind reels upon opposite sides of said bottom opening, a plurality of superimposed record and carbon strips passing from said supply reel to said rewind reel with a carbon coated surface presented toward said bottom opening, guides for said strips, and co-operating means carried by said rewind reel and said pivotal frame, whereby said strips will be advanced with each actuation of said frame by said cams following the making of each impression.

5. A collector's stamp embodying therein a housing having openings through the bottom and the top thereof, a printing mechanism including a rocking frame pivoted against the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative shaft, a cam on said shaft having a gradual rise, an abrupt fall and a sequence of short rises and falls adjacent the end of said rise, means engageable by said cam carried by and spaced radially from the pivotal support of said frame, whereby the power of said cam is applied to said frame at an effective leverage, supply and rewind reels upon opposite sides of said bottom opening, a plurality of superimposed record and carbon strips passing from said supply reel to said rewind reel with a carbon coated surface presented toward said bottom opening, guides for said strips, and co-operating means carried by said rewind reel and said pivotal frame, whereby said strips will be advanced with each actuation of said frame by said cams following the making of each impression.

6. A collector's stamp embodying therein a housing having an opening through the bottom thereof, a bottom plate pivotally connected with said housing and having an opening therethrough below the opening in the top of said housing, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative power compounding mechanism acting upon said spring through said frame, supply and rewind reels upon opposite sides of said bottom opening, a plurality of superimposed record and carbon strips passing from said supply reel to said rewind reel with a carbon coated surface presented toward said bottom opening, guides for said strips, and co-operating means carried by said rewind reel and said pivotal frame, whereby said strips will be advanced with each actuation of said frame by said power compounding mechanism.

7. A collector's stamp embodying therein a housing having an opening through the bottom thereof, a bottom plate pivotally connected with said housing and having an opening therethrough below the opening in the top of said housing, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative power compounding mechanism acting upon said spring through said frame, supply and rewind reels upon opposite sides of said bottom opening, a plurality of superimposed record and carbon strips passing from said supply reel to said rewind reel with a carbon coated surface presented toward said bottom opening, guides for said strips, co-operating means carried by said rewind reel and said pivotal frame, whereby said strips will be advanced with each actuation of said frame by said power compounding mechanism, a platen base having side flanges so spaced as to receive said housing, and means connecting said housing with said side flanges to form an opening below the bottom of said housing for the reception of a record strip, said means including a removable lock pin passing through said flanges in the walls of said housing.

8. A collector's stamp embodying therein a housing having openings through the bottom and the top thereof, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a tie rod adjacent the top and the end of said housing opposite the point of pivotal connection of said frame, torsion springs mounted adjacent the ends of said rod and having extended ends, one of which bears upon the top of said housing, and the other of which bears upon an end of the shaft supporting said indicia wheels, a manually operative power compounding mechanism acting upon said springs through said frame, supply and rewind reels upon opposite sides of said bottom opening, a plurality of superimposed record and carbon strips passing from said supply reel to said rewind reel with a carbon coated surface presented toward said bottom opening, guides for said strips, and co-operating means carried by said rewind reel and said pivotal frame, whereby said strips will be advanced with each actuation of said frame by said power compounding mechanism.

9. A collector's stamp embodying therein a housing having openings through the bottom and the top thereof, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative power compounding mechanism acting upon said spring through said frame, plates secured to the side walls of said housing, each of said plates having downwardly opening slots therein adjacent the opposite sides of said bottom opening, guide bars extending from one of said plates to the other intermediate said slots and upon opposite sides of said bottom opening, the sides of said housing having bearings alined with said slots, supply and rewind reels seated in said slots and mounted in the adjacent bearings, a plurality of superimposed record and carbon strips passing from said supply reel to said rewind reel with a carbon coated surface presented toward said bottom opening, and co-operating means carried by said rewind reel and said pivotal frame, whereby said strips will be advanced with each actuation of said frame by said power compounding mechanism.

10. A collector's stamp embodying therein a housing having openings through the bottom and the top thereof, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative power compounding mechanism acting upon said spring through said frame, supply and rewind reels upon opposite sides of said bottom opening, a plurality of superimposed record and carbon strips passing from said supply reel to said rewind reel with a carbon coated surface presented toward said bottom opening, guides for said strips, a ratchet wheel upon said rewind reel, a spring pressed detent pawl co-operating therewith, and a spring pressed ratchet pawl carried by said frame and co-operating with said ratchet wheel, whereby said strips will be advanced with each actuation of said frame by said power compounding mechanism.

11. A collector's stamp embodying therein a housing having openings through the bottom and the top thereof, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative power compounding mechanism acting upon said spring through said frame, supply and rewind reels upon opposite sides of said bottom opening, said supply reel having a flange thereon, a downwardly projecting retard spring engageable with said flange, a plurality of superimposed record and carbon strips passing from said supply reel to said rewind reel with a carbon coated surface presented toward said bottom opening, guides for said strips, a ratchet wheel upon said rewind reel, a spring pressed detent pawl co-operating therewith, and a spring pressed ratchet pawl carried by said frame and co-operating with said ratchet wheel, whereby said strips will be advanced with each actuation of said frame by said power compounding mechanism.

12. A collector's stamp embodying therein a housing having openings through the bottom and the top thereof, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative shaft, a cam carried thereby having a gradual rise and an abrupt fall, means engageable by said cam carried by and spaced radially from the pivotal support of said frame, whereby the power of said cam is applied to said frame at an effective leverage, supply and rewind reels upon opposite sides of said bottom opening, a plurality of superimposed record and carbon strips passing from said supply reel to said rewind reel with a carbon coated surface presented toward said bottom opening, guides for said strips, co-operating means carried by said rewind reel and said pivotal frame, whereby said strips will be advanced with each actuation of said frame by said cams following the making of each impression, a platen base having side flanges so spaced as to receive said housing, and means connecting said housing with said side flanges to form an opening below the bottom of said housing for the reception of a record strip, said means including a removable lock pin passing through said flanges in the walls of said housing.

13. A collector's stamp embodying therein a housing having an opening through the bottom thereof, a bottom plate pivotally connected with said housing and having an opening therethrough below the opening in the top of said housing, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a manually operative power compounding mechanism acting upon said spring through said frame, supply and rewind reels upon opposite sides of said bottom opening, a plurality of superimposed record and carbon strips passing from said supply reel to said rewind reel with a carbon coated surface presented toward said bottom opening, guides for said strips, co-operating means carried by said rewind reel and said pivotal frame, whereby said strips will be advanced with each actuation of said frame by said power compounding mechanism, a platen base having side flanges so spaced as to receive said housing, and means connecting said housing with said side flanges to form an opening below the bottom of said housing for the reception of a record strip, said means including a removable lock pin passing through said flanges in the walls of said housing.

14. A collector's stamp embodying therein a housing having an opening through the bottom thereof, a bottom plate pivotally connected with said housing and having an opening therethrough below the opening in the top of said housing, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a tie rod adjacent the top and the end of said housing opposite the point of pivotal connection of said frame, torsion springs mounted adjacent the ends of said rod and having extended ends, one of which bears upon the top of said housing, and the other of which bears upon an end of the shaft supporting said indicia wheels, a manually operative power compounding mechanism acting upon said springs through said frame, supply and rewind reels upon opposite sides of said bottom opening, a plurality of superimposed record and carbon strips passing from said supply reel to said rewind reel with a carbon coated surface presented toward said bottom opening, guides for said strips, co-operating means carried by said rewind reel and said pivotal frame, whereby said strips will be advanced with each actuation of said frame by said power compounding mechanism, a platen base having side flanges so spaced as to receive said housing, and means connecting said housing with said side flanges to form an opening below the bottom of said housing for the reception of a record strip, said means including a removable lock pin passing through said flanges in the walls of said housing.

15. A collector's stamp embodying therein a housing having an opening through the bottom thereof, a bottom plate pivotally connected with said housing and having an opening therethrough below the opening in the top of said housing, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a tie rod adjacent the top and the end of said housing opposite the point of pivotal connection of said frame, torsion springs mounted adjacent the ends of said rod and having extended ends, one of which bears upon the top of said housing, and the other of which bears upon an end of the shaft supporting said indicia wheels, a manually operative power compounding mechanism acting upon said springs through said frame, plates secured to the side walls of said housing, each of said plates having downwardly opening slots therein adjacent the opposite sides of said bottom opening, guide bars extending from one of said plates to the other intermediate said slots and upon opposite sides of said bottom opening, the sides of said housing having bearings alined with said slots, supply and rewind reels seated in said slots and mounted in the adjacent bearings, a plurality of superimposed record and carbon strips passing from said supply reel to said rewind reel with a carbon coated surface presented toward said bottom opening, co-operating means carried by said rewind reel and said pivotal frame, whereby said strips will be advanced with each actuation of said frame by said power compounding mechanism, a platen base having side flanges so spaced as to receive said housing, and means connecting said housing with said side flanges to form an opening below the bottom of said housing for the reception of a record strip, said means including a removable lock pin passing through said flanges in the walls of said housing.

16. A collector's stamp embodying therein a housing having an opening through the bottom thereof, a bottom plate pivotally connected with said housing and having an opening therethrough below the opening in the top of said housing, a printing mechanism including a rocking frame pivoted adjacent the bottom and one end of said housing, a shaft adjacent the free end of said frame, and plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a tie rod adjacent the top and the end of said housing opposite the point of pivotal connection of said frame, torsion springs mounted adjacent the ends of said rod and having extended ends, one of which bears upon the top of said housing, and the other of which bears upon an end of the shaft supporting said indicia wheels, a manually operative power compounding mechanism acting upon said springs through said frame, plates secured to the side walls of said housing, each of said plates having downwardly opening slots therein adjacent the opposite sides of said bottom opening, guide bars extending from one of said plates to the other intermediate said slots and upon opposite sides of said bottom opening, the sides of said housing having bearings alined with said slots, supply and rewind reels seated in said slots and mounted in the adjacent bearings, a plurality of superimposed record and carbon strips passing from said supply reel to said rewind reel with a carbon coated surface presented toward said bottom opening, a ratchet wheel upon said rewind reel, a spring pressed detent pawl co-operating therewith, a spring pressed ratchet pawl carried by said frame and co-operating with said ratchet wheel, whereby said strips will be advanced with each actuation of said frame by said power compounding mechanism, a platen base having side flanges so spaced as to receive said housing, and means connecting said housing with said side flanges to form an opening below the bottom of said housing for the reception of a record strip, said means including a removable lock pin passing through said flanges in the walls of said housing.

17. A collector's stamp embodying therein a housing having openings through the bottom and the top thereof, a printing mechanism including a rocking frame pivoted adjacent the bottom and one end of said housing, a shaft adjacent the free end of said frame, and a plurality of indicia wheels idly mounted upon said shaft, each having a plurality of duplicated printing and non-printing characters so spaced in relation to each other that when a printing character is at the opening in the bottom, the duplicate non-printing character is visible at the opening in the top, of said housing, a spring acting upon said frame adjacent said indicia wheels, a shaft, a hand crank carried by said shaft, one portion of which is hinged in relation to the other, said housing having an opening adapted to receive the handhold of said crank to prevent accidental rotation of said shaft, a cam carried thereby having a gradual rise and an abrupt fall, means engageable by said cam carried by and spaced radially from the pivotal support of said frame, whereby the power of said cam is applied to said frame at an effective leverage, supply and rewind reels upon opposite sides of said bottom opening, a plurality of superimposed record and carbon strips passing from said supply reel to said rewind reel with a carbon coated surface presented toward said bottom opening, guides for said strips, co-operating means carried by said rewind reel and said pivotal frame, whereby said strips will be advanced with each actuation of said frame by said cams following the making of each impression, a platen base having side flanges so spaced as to receive said housing, and means connecting said housing with said side flanges to form an opening below the bottom of said housing for the reception of a record strip, said means including a removable lock pin passing through said flanges in the walls of said housing.

GEORGE J. MATT.